(12) United States Patent
Mountain

(10) Patent No.: US 7,661,120 B2
(45) Date of Patent: Feb. 9, 2010

(54) AUTOMATED TRANSPORT STREAM APPARATUS AND METHOD

(75) Inventor: Ned L. Mountain, Sautee, GA (US)

(73) Assignee: Wegener Communications, Inc., Duluth, GA (US)

(*) Notice: Subject to any disclaimer, the term of this patent is extended or adjusted under 35 U.S.C. 154(b) by 993 days.

(21) Appl. No.: 10/723,523

(22) Filed: Nov. 26, 2003

(65) Prior Publication Data
US 2005/0114890 A1 May 26, 2005

(51) Int. Cl.
G06F 13/00 (2006.01)
H04N 7/173 (2006.01)

(52) U.S. Cl. ............ 725/50; 725/91; 725/114; 725/138; 725/144; 725/54

(58) Field of Classification Search ......... 725/114, 725/50, 144, 138
See application file for complete search history.

(56) References Cited

U.S. PATENT DOCUMENTS

| | | | |
|---|---|---|---|
| 2,959,639 | A | 11/1960 | Pierce |
| 4,613,903 | A | 9/1986 | Nadan |
| 5,298,994 | A | 3/1994 | Watanabe et al. |
| 5,311,297 | A | 5/1994 | Seki et al. |
| 5,473,381 | A | 12/1995 | Lee |
| 5,923,374 | A | 7/1999 | James |
| 6,108,041 | A | 8/2000 | Faroudja et al. |
| RE37,070 | E | 2/2001 | Kim et al. |
| 6,226,038 | B1 | 5/2001 | Frink et al. |
| 6,549,240 | B1 | 4/2003 | Reitmeier |
| 6,704,930 | B1 * | 3/2004 | Eldering et al. ............ 725/36 |
| 2002/0041756 | A1 | 4/2002 | Kato |
| 2002/0063794 | A1 | 5/2002 | Willis |
| 2002/0071052 | A1 | 6/2002 | Itoh et al. |
| 2002/0075954 | A1 | 6/2002 | Vince |
| 2002/0162114 | A1 | 10/2002 | Bisher, Jr. et al. |
| 2002/0184649 | A1 * | 12/2002 | Wilson ................ 725/114 |
| 2003/0112834 | A1 * | 6/2003 | Karasawa ............. 370/537 |
| 2003/0152151 | A1 | 8/2003 | Hsieh et al. |
| 2003/0190138 | A1 * | 10/2003 | Yuen et al. ............. 386/46 |
| 2005/0034155 | A1 * | 2/2005 | Gordon et al. ........... 725/39 |

* cited by examiner

*Primary Examiner*—Joseph P Hirl
*Assistant Examiner*—Jun Fei Zhong
(74) *Attorney, Agent, or Firm*—Robert C. Haldiman; Husch Blackwell Sanders LLP

(57) ABSTRACT

A mapping processor is configured to receive a current PAT from the input data stream, and to compare input program numbers in the current PAT to known program numbers in the stored format table. If the input program numbers in the current PAT are the same as the input program numbers in the stored format table, then another data stream is output having output program numbers from the stored format table. If the input program numbers in the current PAT are not the same as the input program numbers in the stored format table, then another data stream is output having reassigned output program numbers. The reassigned output program numbers may be from another stored format table in the memory, if the other stored format table has input program numbers that match the input program numbers in the current PAT. If not the reassigned output program numbers may be newly generated.

37 Claims, 14 Drawing Sheets

| Syntax | No. of bits | Mnemonic |
|---|---|---|
| program_association_section() { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   for (i = 0; i < N; i++) { | | |
|     program_number | 16 | uimsbf |
|     reserved | 3 | bslbf |
|     if (program_number == '0') { | | |
|       network_PID | 13 | uimsbf |
|     } | | |
|     else { | | |
|       program_map_PID | 13 | uimsbf |
|     } | | |
|   } | | |
|   CRC_32 | 32 | rpchof |
| } | | |

Fig. 2
Prior Art

| Syntax | No. of bits | Mnemonic |
|---|---|---|
| TS_program_map_section() { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i = 0; i < N; i++) { | | |
|     descriptor() | | |
|   } | | |
|   for (i = 0; i < N1; i++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for (i = 0; i < N2; i++) { | | |
|       descriptor() | | |
|     } | | |
|   } | | |
|   CRC_32 | 32 | rpchof |
| } | | |

Fig. 3
Prior Art

| Item | Input | Input Program Number | Output | Output Program Number | Enable |
|---|---|---|---|---|---|
| 1 | 1 | 3 | 1 | 1 | Active |
| 2 | 1 | 2 | 1 | 2 | Active |
| 3 | 2 | 2 | 1 | 3 | Active |
| 4 | 2 | 3 | 1 | 4 | Active |
| 5 | 2 | 4 | 2 | 5 | Active |
| 6 | 2 | 5 | 2 | 6 | Active |
| 7 | 0 | 0 | 0 | 0 | Inactive |
| 8 | 0 | 0 | 0 | 0 | Inactive |

Fig.13

| Item | Program Table Item Number | Input | Input PID | Output | Output PID | Stream Type |
|---|---|---|---|---|---|---|
| 1 | 1 | 1 | 49 | 1 | 49 | 2 |
| 2 | 1 | 1 | 52 | 1 | 52 | 129 |
| 3 | 2 | 1 | 33 | 1 | 33 | 2 |
| 4 | 2 | 1 | 36 | 1 | 36 | 129 |
| 5 | 3 | 2 | 49 | 1 | 101 | 2 |
| 6 | 3 | 2 | 52 | 1 | 102 | 129 |
| 7 | 4 | 2 | 33 | 1 | 104 | 2 |
| 8 | 4 | 2 | 36 | 1 | 105 | 129 |
| 9 | 5 | 2 | 65 | 2 | 65 | 2 |
| 10 | 5 | 2 | 68 | 2 | 68 | 129 |
| 11 | 6 | 2 | 81 | 2 | 81 | 2 |
| 12 | 6 | 2 | 84 | 2 | 84 | 129 |
| 13 | 0 | 0 | 0 | 0 | 0 | 0 |
| 14 | 0 | 0 | 0 | 0 | 0 | 0 |

Fig. 14

AUTOMATED TRANSPORT STREAM APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention is in the field of content data distribution networks, especially broadcast of digital audio and video data. The invention automates the remapping of transport streams received in a first format into a second format, as is executed at a cable TV system head end. In particular, the invention relates to automated accomodation of transmittal format changes, including mapping changes.

2. Related Art

For digital video, audio and data content, most distribution systems commonly work according to common familiar concepts. Multiple content data streams are divided into packets, multiplexed, transmitted, demultiplexed and routed for use to various end user displays. The MPEG2 protocols are illustrative of the class, and characteristic of the embodiments discussed herein. Other protocols such as MPEG1 or DSS are alike in function although they vary in detail.

The Moving Picture Experts Group (MPEG) is the expert group of the International Organization for Standardization (ISO) that has defined the MPEG-2 standard (ISO/IEC 13818), which is incorporated by reference herein. This MPEG-2 standard protocol defines one protocol that can be used to encode, multiplex, transmit and de-multiplex and decode video, audio and data bitstreams.

Video compression is an important part of the MPEG standards. Additionally, MPEG-2 includes a family of standards involving different aspects of digital video and audio transmission and representation. The general MPEG-2 standard is currently divided into eight parts, including systems, video, audio, compliance, software simulation, digital storage media, real-time interface for system decoders, and DSM reference script format.

The video portion of the MPEG-2 standard (ISO/IEC 13818-2) sets forth the manner in which pictures and frames are defined, how video data is compressed, various syntax elements, the video decoding process, and other information related to the format of a coded video bitstream. The audio portion of the MPEG-2 standard (ISO/IEC 13818-3) similarly describes the audio compression and coding techniques utilized in MPEG-2. The video and audio portions of the MPEG-2 standard therefore define the protocol with which audio or video information is represented.

At some point, the video, audio, and other digital information must be multiplexed together to provide encoded bitstreams for delivery to the target destination. The Systems portion of the MPEG-2 standard (ISO/IEC 13818-1) defines how these bitstreams are synchronized and multiplexed together. It does not specify the encoding method. Instead, it defines only the resulting bit stream. Typically, video and audio data are encoded at respective video and audio encoders, and the resulting encoded video and audio data is input to an MPEG-2 Systems encoder/multiplexer. This Systems multiplexer can also receive other inputs, including control and management information such as authorization identifiers, private data bitstreams, and time stamp information. The resulting coded, multiplexed signal is referred to as the MPEG-2 transport stream. Generally, a data transport stream is also the format in which digital information is delivered via a network to a receiver for display.

The video and audio encoders provide encoded information to the Systems multiplexer in the form of an "elementary stream". These elementary streams are "packetized" into packetized elementary streams which are comprised of many packets. Each packet includes a packet payload corresponding to the content data to be sent within the packet, and a packet header that includes information relating to the type, size, and other characteristics of the packet payload.

Elementary stream packets from the video and audio encoders are mapped into transport stream packets at the Systems encoder/multiplexor. The transport packets differ from the elementary stream packets in that transport stream packets are a uniform size; 188 bytes. Each transport stream packet includes a payload portion which corresponds to a portion of the elementary packet stream, and further includes a transport stream packet header. The transport stream packet header provides information used to transport and deliver the information stream, as compared to the elementary stream packet headers that provide information directly related to the elementary stream.

Each transport packet header includes a packet identifier (PID) to identify the elementary stream to which the packet belongs. The PID is a 13-bit field that identifies the transport packet, and defines the type of payload in the transport packet payload.

Each transport stream typically transports multiple programs for display. Programs are comprised of the coordinated display of a video elementary bitstream of data, one or two audio steams of data, and sometimes a data stream for closed captioning, weather, stock or other information. The transport stream is a multiplex containing each of these different packetized elementary streams for each of the plurality of programs being transported. A typical MPEG2 transport stream carries on the order of 250 elementary streams, which may correspond to approximately 100 programs.

When the various packetized streams are de-multiplexed, the elementary stream packets must be organized so that all packets corresponding to a common program are output as coherent content. Tables are used to do this. The tables are sent as separate packets in the transport stream. They have their own PIDs that are different than the content data PIDs. They are called Program Association Tables and Program Map Tables.

A program of content data may be, for example, movies aired by HBO, news aired by NBC, or a sporting event aired on pay-per-view. Usually, each program is a synchronized composite of a video elementary stream and two audio elementary streams. Each elementary stream is identified with a unique PID. All the packets in that elementary stream contain the same PID in their headers. Separately, each program is assigned a number, which is referred to as a program number. A program numbers are allotted a 16 bit field in the program association section of an MPEG2 transport stream, see ISO/IEC 31818-1; § 2.4.4.3. Although this enables as many as 8,000 different program numbers, in practice, for reasons both technical and human, often just numbers between 1 and 500 are used by content providers to designate programs. Although program numbers may be made to correspond to a "channel" number seen by an end user on her television, usually the programs numbers are arbitrary. Significantly, program numbers can be and often are changed. The changes are also often arbitrary and frequently unannounced, as will be discussed below.

Program Association Tables assign the proper elementary streams to the programs they represent. The Program Association Table (PAT) is a simple two column table listing the program numbers and next to each a PID for a Program Map Table (PMT) that is unique to that program. Program Association Tables are transmitted periodically in the transport stream for access by de-coders. Program Association Tables are always PID 0, and they are one of the first items referenced by a decoder when it powers up. The decoder uses the PAT to look up a PID for the PMT of the program that has been selected by a viewer. The decoder isolates that PID in the transport stream and reads the PMT from the data payload portion of the packet. Within each Program Map Table is the listing of the PIDs of the elementary streams that together comprise that program. The decoder then isolates the packets identified by the proper PIDs and routes them to a TV for display.

For example, if ABC programming has been assigned program number 22, "Survivor" and "Monday Night Football" will be transmitted under that number in the Program Association Table. The Program Association Table will list the PID of the Program Map Table that is unique to that programming. Within that Program Map Table will be listed the video elementary stream 101 (for example), audio stream 151 and audio stream 152 and, perhaps, data stream 73 for closed captioning. As the transport stream continues to be received, packets with those PIDs are routed for display, until a viewer selects a different program.

The Data Transport Stream

FIGS. 1 through 5 illustrate the make up of an MPEG data transport stream. FIG. 1 graphically depicts one transport packet. It is divided into a 4 byte header and a 184 byte payload. The payload is depicted as a variable amount of data bytes and a variable amount of adaptation bytes called "stuffing" bytes, which are more fully described below.

The header carries information necessary for proper reading and routing of the payload data. Among this information, whose nature and purpose are known, is the PID, or packet identifier. Each part of the header is routinely isolated and routed from the transport stream for processing at various stages of the data distribution. Insofar as is relevant to the present invention, PIDs are acted upon at a low, routine level by packet processors.

PATs and PMTs are carried as payloads. They are found, isolated and routed according to their PIDs. PATs are always PID 0. PMT PIDs are assigned in the PATs.

FIG. 2 illustrates relevant portions of the MPEG syntax for a PAT. FIG. 4 is a detail of a packet payload comprising a PAT. The PAT is transmitted in up to 256 sections. This information from these sections is combined to crate the whole PAT. Each section has the structure shown in FIG. 4. The table id is a value of 00H, which indicates that this is a PAT section. The CRC32 field is a checksum which shows whether there is an error in the section. The useful PAT information is contained in the N loop area. This is a series of repeated fields which recites the PNs and their PIDs. As can be seen, a 16 bit field is used to assign a program number. The PAT further associates the assigned program number with a PMT by assigning a PID for the packet containing the PMT.

FIG. 3 illustrates relevant portions of the MPEG syntax for a PMT. FIG. 5 is a detail of a packet payload comprising a PMT. As can be seen, another 16 bit field is used to record the program number associated with the particular PMT. The PMT further assigns PIDs of the elementary streams comprising the programming for the associated program number, the elementary stream PIDs being in another 13 bit field. The table id has a value of 02H, which indicates that it is a PMT. The N-loop-descriptors area which follows program-info-length, contains various optional technical information about the program. The N-loop area contains a repeated group of fields, each of which gives the PID of an Elementary Stream (ES) of the Program. The PMT identifies the type and PID number of each ES for the program.

Looking at the entry detail shown for one elementary stream, we find an 8-bit field for stream type. For example, a value of 01H indicates video, while 04H indicates audio encoded according to ISO 13818-3 compression. The 13-bit PID locates the elementary stream data. The 12-bit elementary stream-info-length field gives us the total length of the following N-loop-descriptors. These descriptors give various optional technical information about the elementary system. The data for a single program number is not usually allowed to span multiple sections.

Like any digital data, MPEG transport streams may be modulated for transmission in a wide variety of means. Quadratic Amplitude Modulation is common. RF carrier frequencies over the air and/or through cables are used. The transport modes used include satellite transmission, traditional over the air broadcasting by land antennas, cable or fiber optic networks or the Internet. A variety of programming content data providers send content data including satellite transmission distributors and traditional over the air broadcasters.

Satellite transmission RF carrier frequencies are allocated in channels with a preconfigured capacity or bandwidth. A standard channel bandwidth is 19.3 Mb/s, which transmits one MPEG transport stream. Any given satellite may transmit on the order of 30 channels and transport streams.

Cable systems, usually limited to distribution in a certain geographic portion of a metropolitan area, typically use an output RF carrier with a capacity of 38.8 Mb/s or 26.97 Mb/s, depending on whether it uses 256 QAM or 64 QAM. Multiple outputs are common. What is output over these cable systems is also an MPEG transport stream.

The hardware at cable system head ends is typically capable of and configured to receive transport streams from multiple sources simultaneously. These would likely include satellite transmission input, over the air broadcasting and perhaps Internet or other network inputs. They may be input as Asynchronous Serial Interfaces or not. Each cable system requires control of the designation of program numbers for the programming that it distributes in its output transport streams.

There is no coordination of program number designations among the various providers of content data transport streams. Received program numbers usually do not match program numbers assigned by cable systems, and often conflict with the program numbers of other providers as well. This requires at least a check and most often a reconfiguration of the program numbers received by a cable system head end before retransmission over the cable system. This process is called mapping or re-mapping. It involves checking the Program Association Tables in the input transport streams and changing those PATs and their associated PMTs for the output streams. This has heretofor been a manual task, executed by a human operator.

Even more problematic is the fact that individual providers of content data often change their transmission formatting. For a variety of reasons, coordination between providers and cable systems has been historically poor with regard to scheduling or even notice of provider formatting changes. The operators of cable system head ends must remap program numbers due to provider format changes on a regular basis, often with little or no notice. The consequence of tardy remapping is the disappearance of certain programming from view, until the necessary remapping is done.

Provider format changes are made according to provider decisions about what programming to provide at what times, and also about how best to fit that programming in the bandwidth available to them. The situation is best illustrated in light of recently available High Definition (HD) television data streams. Such elementary streams may consume most or all of a transport stream and channel's bandwidth. A single provider may change from filling a particular 19.3 Mb/s channel with one 18 Mb/s HD stream, to truncating the HD signal to 12 Mb/s and adding a Standard Definition (SD) data stream and a 1.5 Mb/s weather radar image, or change again to six SD data streams and no HD stream. This frequently happens in a single day. If these changes change the program numbers, or if the same streams keep their program numbers but arrive on different channels, again remapping must occur. Again, the consequence of tardy remapping is the disappearance of certain programming from view, until the necessary remapping is done.

There is a need in the art for automatic remapping that is rapidly responsive to such format changes, especially unannounced changes.

Two increasingly important technologies further exacerbate a need for automated and "intelligent" remapping. The first has been mentioned; multiple HD signals often will not fit in a single transport stream output onto the cable system. There is a need in the art for automatic remapping that accommodates HD TV. The second is statistical multiplexing.

Statistical multiplexing is a known technique that is particularly suited to MPEG transport stream multiplexing because it allows for transmission of elementary streams having varying data bitrates. In digital video in general and MPEG in particular, a series of video frames showing little or no movement requires a low overall data bit rate, because the pixels are not changing. A portion of video with a great deal of movement, such as a panning shot or action sequence for example, requires a great deal of data to be transmitted. Statistical multiplexing is a technique to accommodate this variability of data flow and still maintain the uniform overall data flow rate necessary for smooth transmission of all the multiplexed elementary streams through buffers and other hardware.

Statistical multiplexing uses known or calculated average bit rates and maximum bit rates to populate a transport stream with an appropriate number of elementary streams. Constant data flow is achieved by filling underutilized packets with fixed bytes called "stuffing bytes." Packets representing a relatively still video sequence contain less that the allotted 184 video data bytes. Therefore it is filled out with the stuffing bytes, which are ignored by receiving display hardware. When one program shows a large amount of movement, its elementary stream reaches a peak bit rate. The buffering hardware at a statistical multiplex uses buffer space that is available due to the deletion of stuffing bytes in other elementary streams, and thereby handles the peak data flow of the high demand stream.

When all the programming elementary streams reach peak rates at once, however, the available capacity may be overwhelmed and data may be lost or degraded. This is called "oversubscribing." Oversubscription response techniques include transfer of an elementary stream to another channel, and transcoding, which selectively deletes some data to maintain throughput of sufficient data.

Incoming transport streams have been managed by their providers to occupy a transport stream with an appropriate number of elementary streams to optimize bandwidth use while minimizing the risk of over subscription. Remapping at a cable system head end must likewise manage the statistical multiplexing of output transport streams. Routing too many high demand elementary streams onto the same transport stream should be avoided. This too is currently done manually. An automated remapper adapted for use with statistical multiplexing is also needed.

SUMMARY OF THE INVENTION

It is in view of the above problems that the present invention was developed. The present invention is an automated remapper for manipulation of incoming transport streams for re-transmission, particularly as would be applied at a cable TV system head end. In a receiver of multiplexed, packetized data streams that outputs other multiplexed, packetized data streams, an output data stream mapper has an interface with an input packetized data stream, a packet processor configured to isolate certain packets and route them, a memory for long term retention of at least one stored format table, the stored format table having input program numbers and output program numbers, and the memory further being configured for short term retention of a current PAT. A mapping processor is configured to receive a current PAT from the input data stream, and to compare input program numbers in the current PAT to known program numbers in the stored format table. If the input program numbers in the current PAT are the same as the input program numbers in the stored format table, then another data stream is output having output program numbers from the stored format table. If the input program numbers in the current PAT are not the same as the input program numbers in the stored format table, then another data stream is output having reassigned output program numbers.

The reassigned output program numbers may be from another stored format table that is found in the memory, if the other stored format table has input program numbers that match the input program numbers in the current PAT. If not the reassigned output program numbers may be newly generated.

The mapper may also reassign PMT PIDs and/or PIDs within the PMTs, again by newly generating them or by reference to stored tables.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 2 (prior art) depicts transport stream PAT packet syntax.

FIG. 3 (prior art) depicts transport stream PMT packet syntax.

FIG. 13 is a packet processor program number table.

FIG. 14 is a packet processor PID table.

DETAILED DESCRIPTION OF THE PREFERRED EMBODIMENTS

Figure 1:
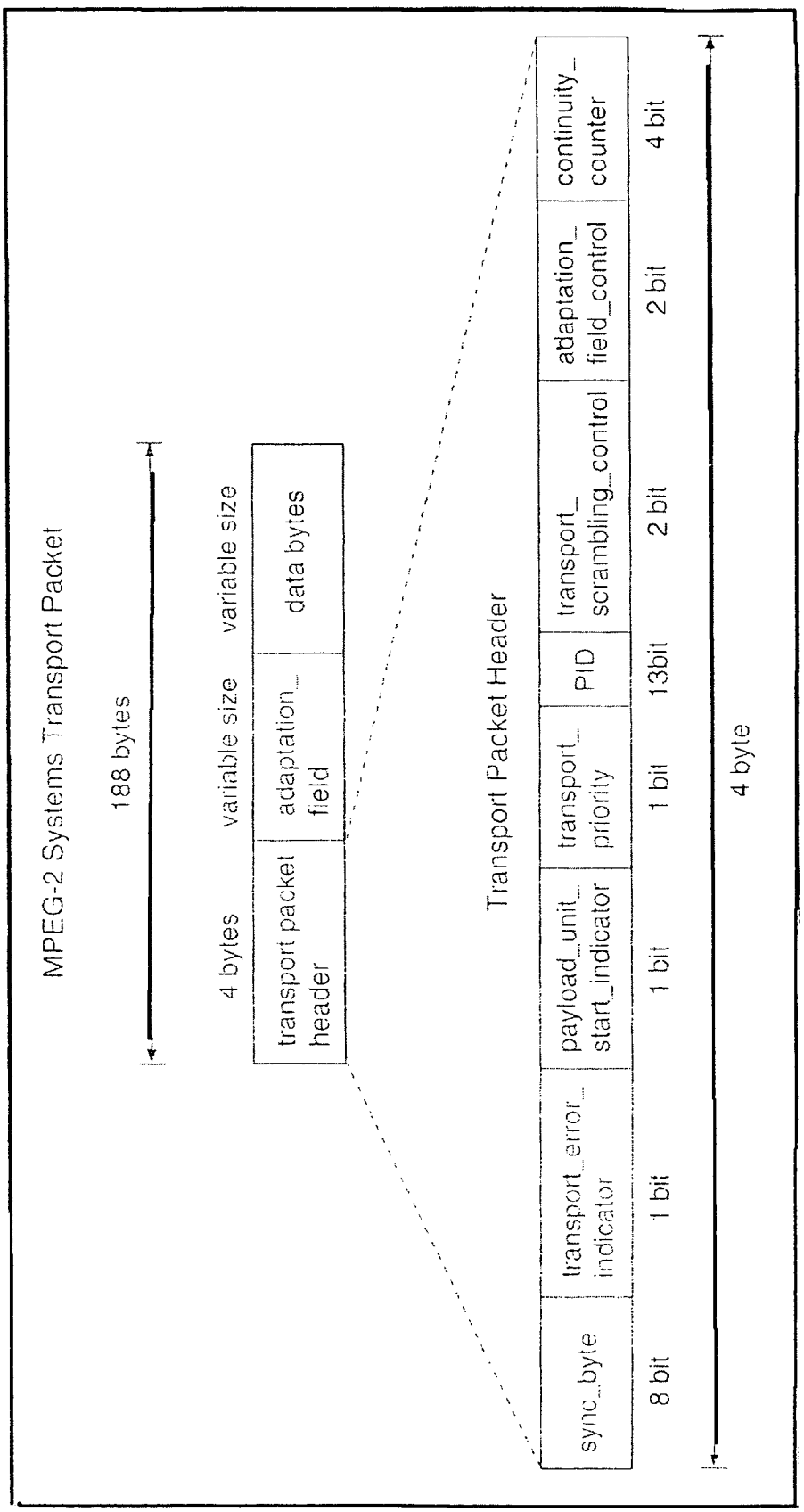
FIG. 1 (prior art) depicts a transport stream packet.
Figure 4:
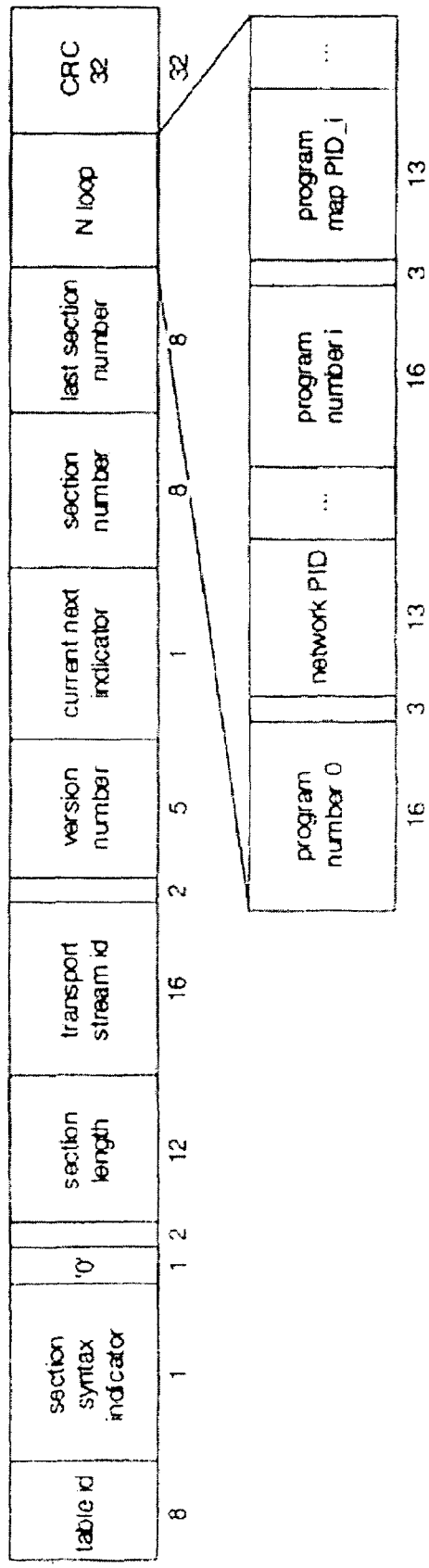
FIG. 4 (prior art) depicts a detail of the PAT portion of a transport stream packet.
Figure 5:
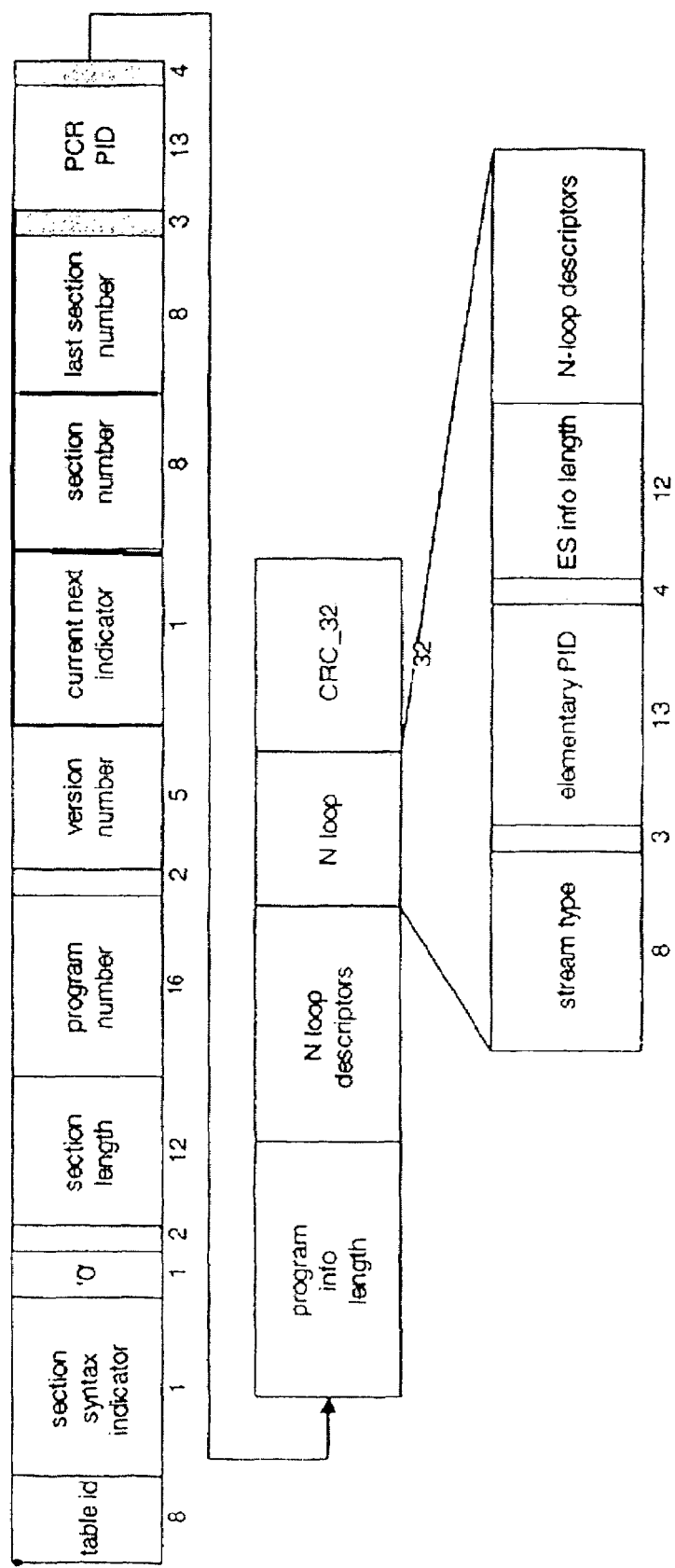
FIG. 5 (prior art) depicts a detail of the PMT portion of transport stream packet.
Figure 6:
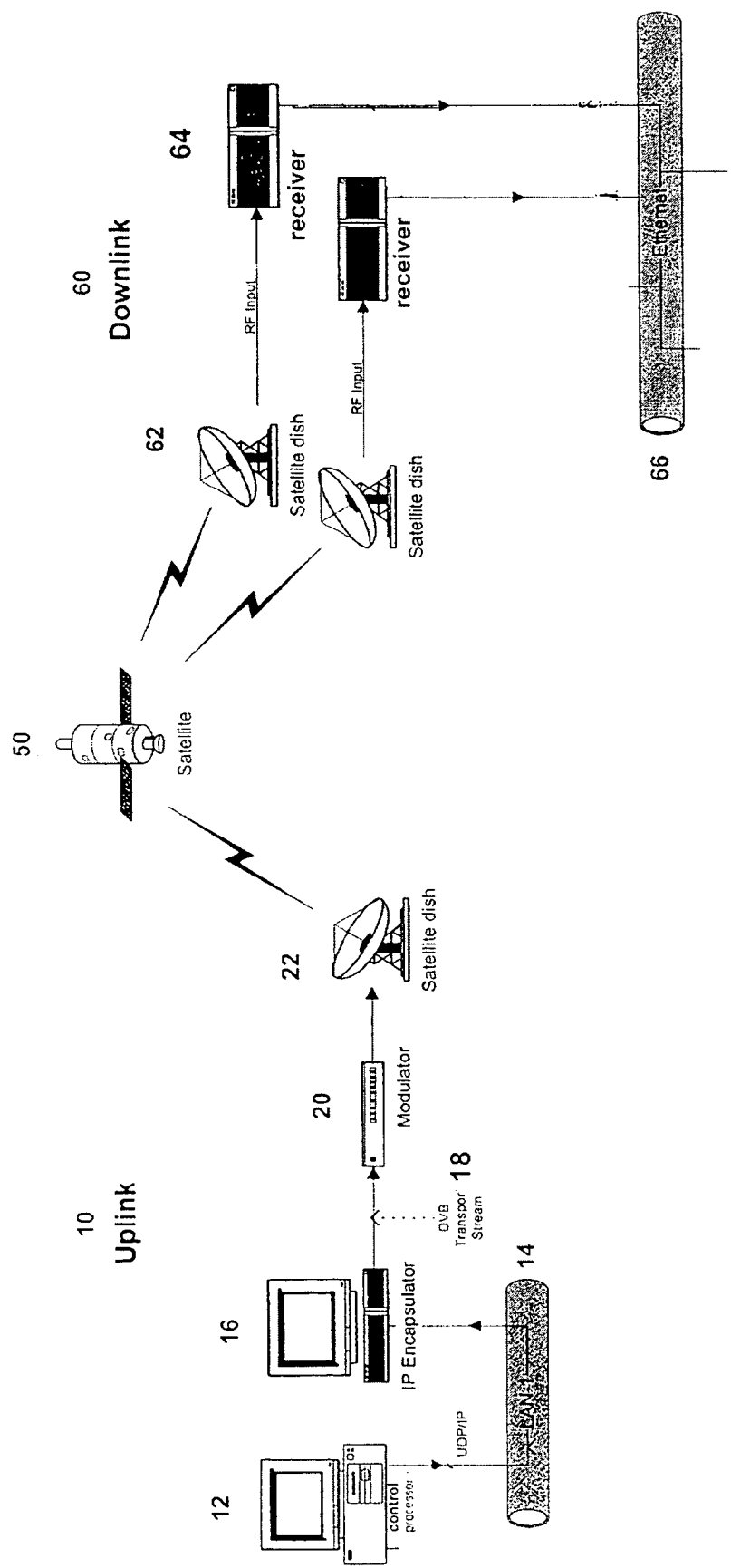
FIG. 6 is a schematic view of a media content data broadcast system.

Referring to the accompanying drawings in which like reference numbers indicate like elements, FIG. 6 is an overview of a satellite broadcast, media content data dissemination system. Satellite 50 receives media content data transmissions from an uplink 10 and rebroadcasts them for receipt by downlinks 60. The digital data in the RF transmission is formatted according to known protocols such as the MPEG standard, and as is more fully described in U.S. patent application Ser. No. 10/382,389 to Pelkey et al., filed Mar. 6, 2003 which is incorporated by reference herein. At multiple downlinks 60 satellite dishes 62 receive the broadcast transmission from the satellite 50. Each satellite dish 62 inputs the received transmission into receiver 64.

The media content data digitized according to MPEG or other protocols are known in the industry as digital video broadcasting transport streams or DVB. It is more fully described in U.S. patent application Ser. No. 10/368,546 to Livaditis et al. filed Feb. 18, 2003, which is incorporated by reference herein.

Figure 7:
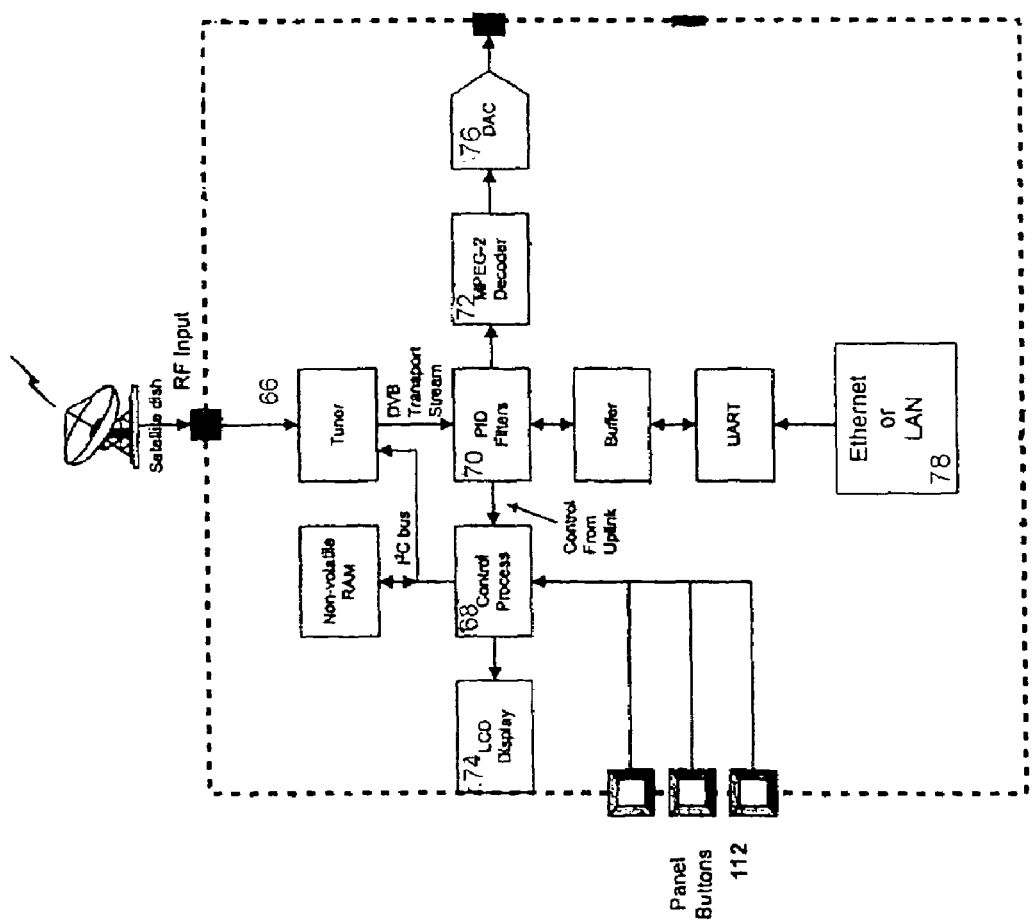
FIG. 7 is a schematic view of a receiver.

FIG. 7 depicts the components of each receiver 64, including a tuner 66, control processor 68, packet identifier filters 70, MPEG decoder 72, operator interface panel 74, digital analog converter 76 and Ethernet or LAN connection 78, together with other components used to execute the receipt, demultiplexing, decoding, conversion and transmission of the content data such as video or audio onward to performance devices such as television screens or speakers, or onto a further distribution system such as a cable service operator's system of cables.

Figure 8:
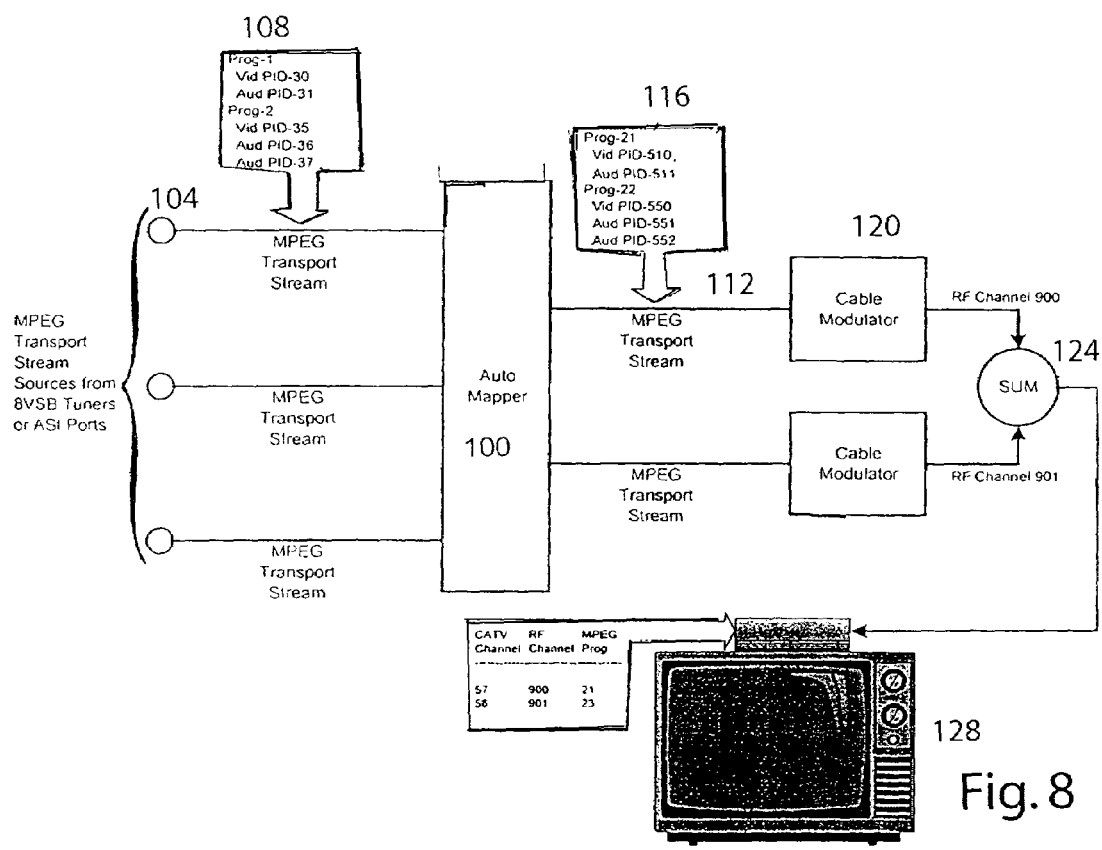
FIG. 8 is a block diagram of the automated remapper.

FIG. 8 is a schematic depiction of the position of the auto mapper of the present invention in the flow of data at a receiving cable system head end. Auto mapper 100 receives a plurality of MPEG transport streams 104. (It is recognized and anticipated that other transport protocols may be used to transmit data, and such use is considered to be within the scope of the present invention.) The input transport streams may be received through ASI ports, and may be received from satellite receiver/decoder or off the air 8VSB tuners or analogous equipment. The program numbers and PIDs are preassigned and the PATs and PMTs are populated with those program numbers and PIDs. These assignments are illustrated in table 108.

The automapper 100 will output a plurality of transport streams 112. The program numbers and PIDs are reassigned by the automapper and the PATs and PMTs are re-populated with new numbers and new PIDs. These assignments are illustrated in table 116. The output transport streams are modulated at modulators 120, summed at summer 124 and sent out onto the cable system to be received by viewers' set top boxes (STB) and TVs, 128.

Figure 9:
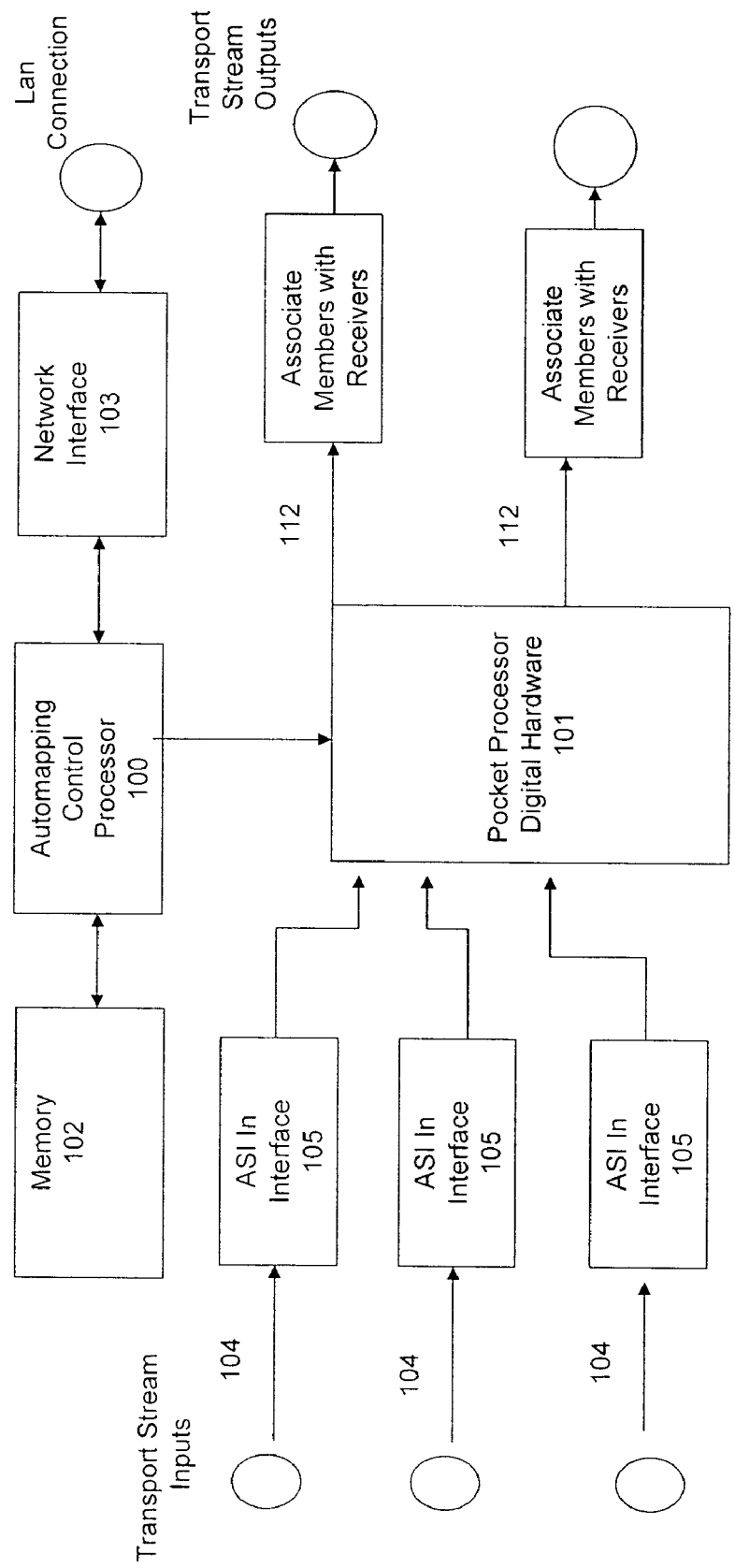
FIG. 9 is a block diagram of the components of the automated remapper.

FIG. 9 is a more detailed block diagram of the automapper. The packet processing of the automapper 100 is performed by a packet processor 101. It receives the incoming transport streams 104, in the depicted embodiment, through Asynchronous Serial Interfaces 105. Packet processor 101 forwards remapped output transport streams 112. A memory 102 and a network interface 103 operatively communicating with auto mapping control processor 100.

Packet processor 101 is a component typical for high data flow operations. A packet processor is used to execute the routing of elementary stream packets into output transport streams. It is frequently a Field Programmable Gate array. It reviews the PIDs of all incoming transport stream packets and routes them as directed. It receives from a higher level processor a Packet Processor Table, which is a final instruction directing routing of packets. This Packet Processor Table identifies the multiple incoming transport streams, the PIDs to remove from them, the multiple output transport streams and into which output streams the pulled packets are to be inserted. Its function is the same whether it receives the Packet Processor Table from an operator's mapping or from the automatic mapping of the present invention.

One function of the memory 102 is to store a table of pre-programmed mapping re-assignments. Although provider communication of transmission format changes to cable system operators is not required and historically poor, it is nevertheless routine for providers to adhere to a predictable schedule. Accordingly a first functional mode of the automapper is to remap from one known transmission format to another. The appropriate re-assignments for recognized transmission formats will be stored in memory 102.

These Stored Format Tables may be constructed in alternative ways that are all within the scope of the present invention. A single table could include input program numbers and transport streams, and output program numbers and output transport streams. Alternatively, a table of input program numbers and transport streams may be separately built and associated with a corresponding table of output program numbers and output transport streams. Moreover, tables of recognizable input program numbers and transport streams may instead be associated with dynamic tables that express intelligent routing preferences, as will be discussed more fully below.

Figure 10:
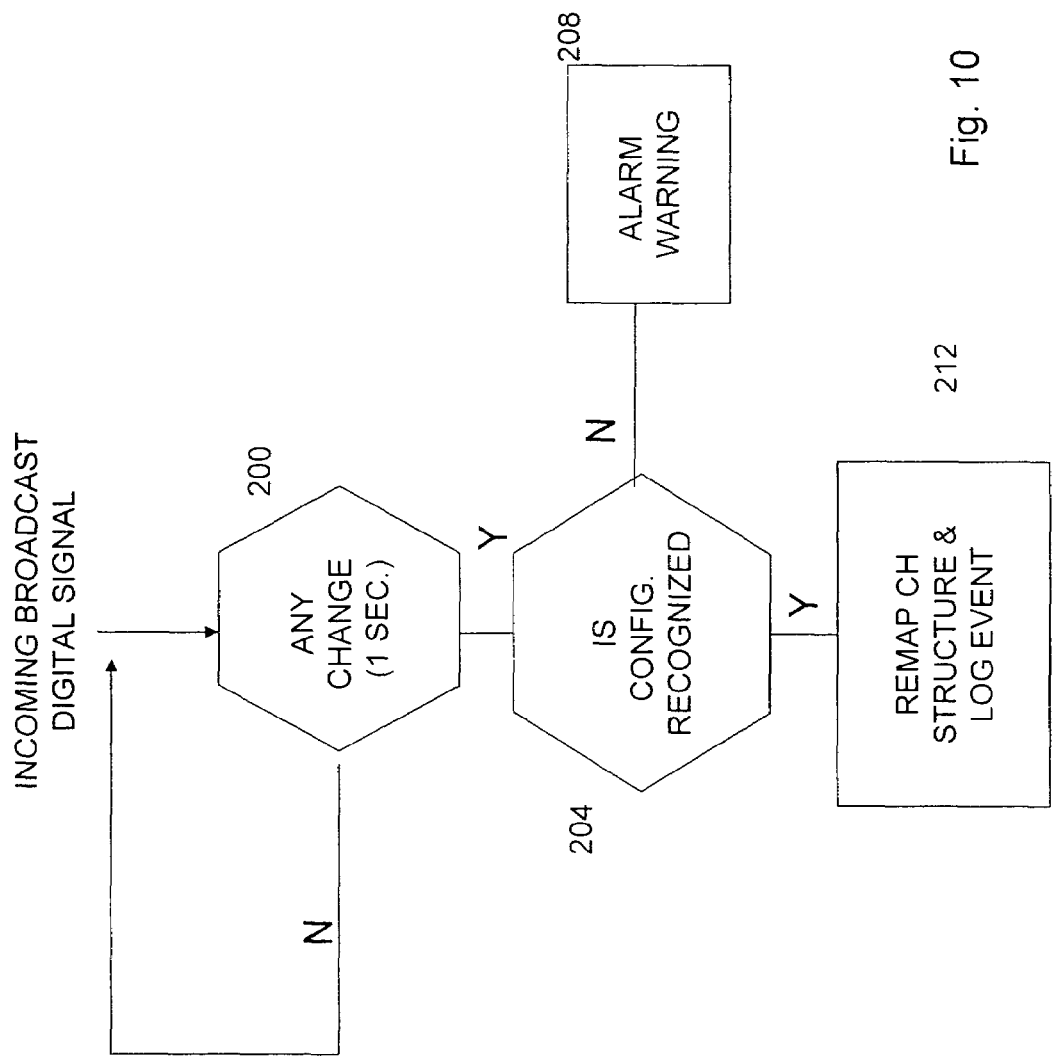
FIG. 10 is a flow chart of a format monitoring method.

FIG. 10 is a flow chart of the baseline routine of the automapper process and method. An incoming transport stream is checked periodically, perhaps every second. PATs are typically transmitted every 700 milliseconds to 1 second. The next current PATs are compared by remapping processor 100 to a stored format table of the known current format stored in memory 102. If no change is detected at check step 200, nothing further is done and the stream is checked again in another second. If a change is detected at step 200, the new PATs and PMTs configurations are compared at step 204 to each of the pre-recorded, known PAT formats in the various stored format tables in memory 102. If the format is found in memory 102, the new transport stream is remapped 212 to a known new output format, again according to the table in memory 102 associated with the known transport format. If the new transport format is not recognized in memory 102, manual remapping will be required and an alarm 208 is sounded for an operator to use a user interface (not shown) on the head end hardware to manually remap the output transport stream. Alternative responses to a change to an unrecognized input format are at step 208 to generate a new output format, or to remap according to preconfigured preferences, such as may be stored in a preference table, as described below.

It is recognized and anticipated that the system and method of the present invention will be deployed with some type of error correction routine, without departing from the scope of the present invention. For example, for a format change to be determined, a certain number of failed correspondences between incoming program numbers and those in the Stored Format Table currently in use may be required, or a first failed correspondence may need to be repeated.

Figure 11:
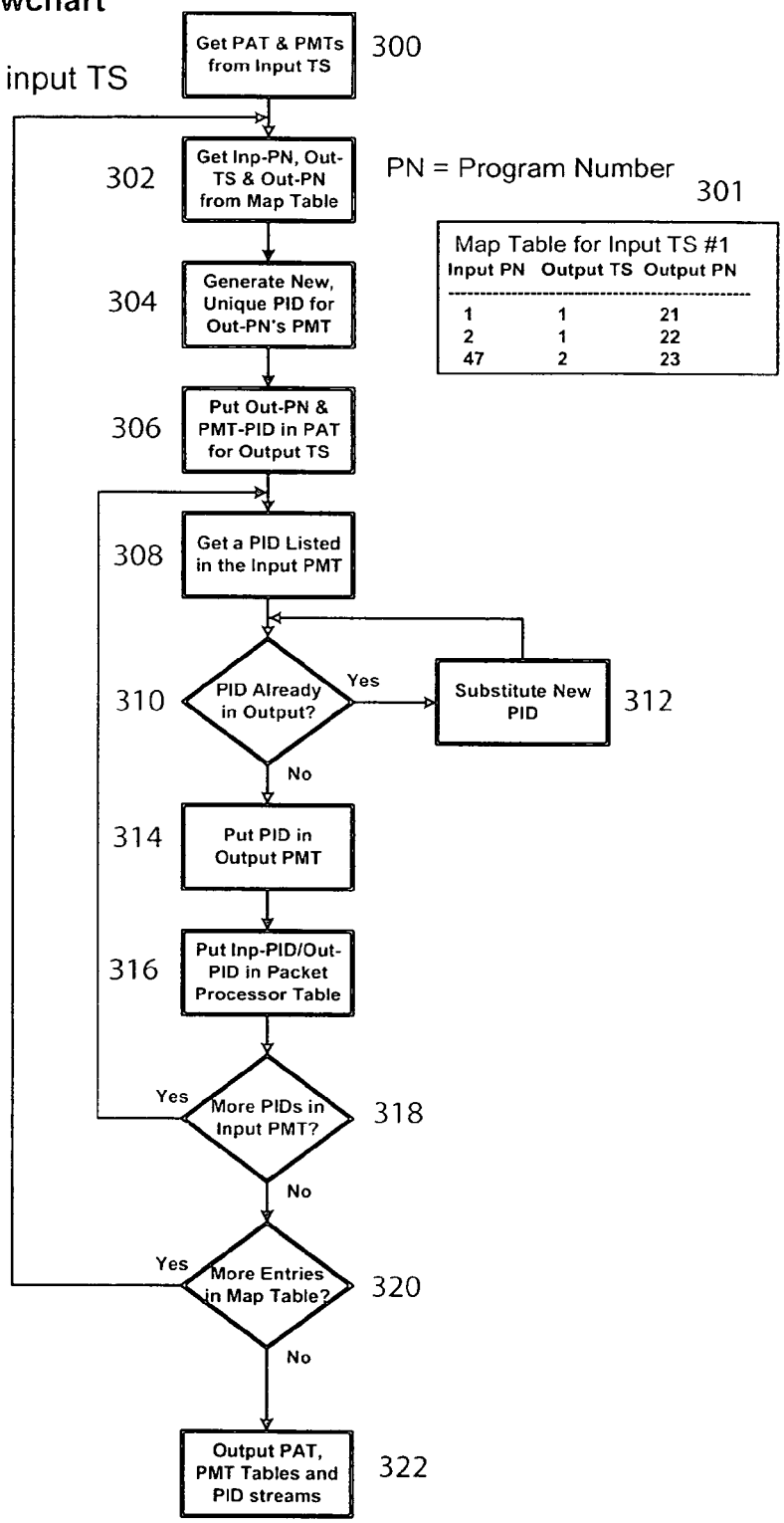
FIG. 11 is a flow chart of a remapping method.

FIG. 11 is a flow chart of the remapping process executed in the "routing" mode for recognized input transport formats. These steps are executed by the remapping processor 100 with reference to memory 102 according to any programming technique.

First the PATs and PMTs from the input transport stream are obtained 300 and stored temporarily in memory 102.

The Stored Format Tables in memory 102, as depicted at 301, contain Input program numbers (PN), output transport streams (TS) and output PNs. As mentioned, Stored Format Tables may be configured in a variety of ways within the scope of the present invention, but in the depicted embodiment, PMTs and their PIDs, as well as the PIDs within the PMTs, are omitted from the Stored Format Table. This is because it is critical to the cable system operation, in most cases, that PNs be unique within that system. The assignment of PMT PIDs and the PIDs within them is usually not critical.

Once the Input PNs, output TSs and output PNs are obtained, a new Packet Processor Table is built in steps 304 through 316. Again, in an alternative embodiment, these could be preconfigured in the Stored Format Table, but in the depicted embodiment they are newly generated. First new unique PIDs are assigned for the PMTs that will map the output PNs 304. Then these are entered into the PAT for the output TS 306.

Next the first PMT from the input stream is isolated by obtaining its PID 308 in the input TS. At step 310 it is determined if that PID is already assigned in the output. If so, a new PID is substituted 312. This may be by incrementing, random generation or other alternative means, all of which remain within the scope of the present invention. Once it is determined that the PID, old or new, is unique, in is put in the output PMT 314.

The corresponding input PID and output PID are entered into the Packet Processor Table 316. The next PID in the selected PMT is incremented 318, determined to be unique and entered in the Packet Processor Table, until all the PIDs in that PMT have been processed.

When a selected PMT is finished, step 320 increments to the next row of the Stored Format Table. When they are all done, the proper PATs, PMTs and PID streams for the cable system to use with the changed and recognized input format are all output, 322.

Figure 12:
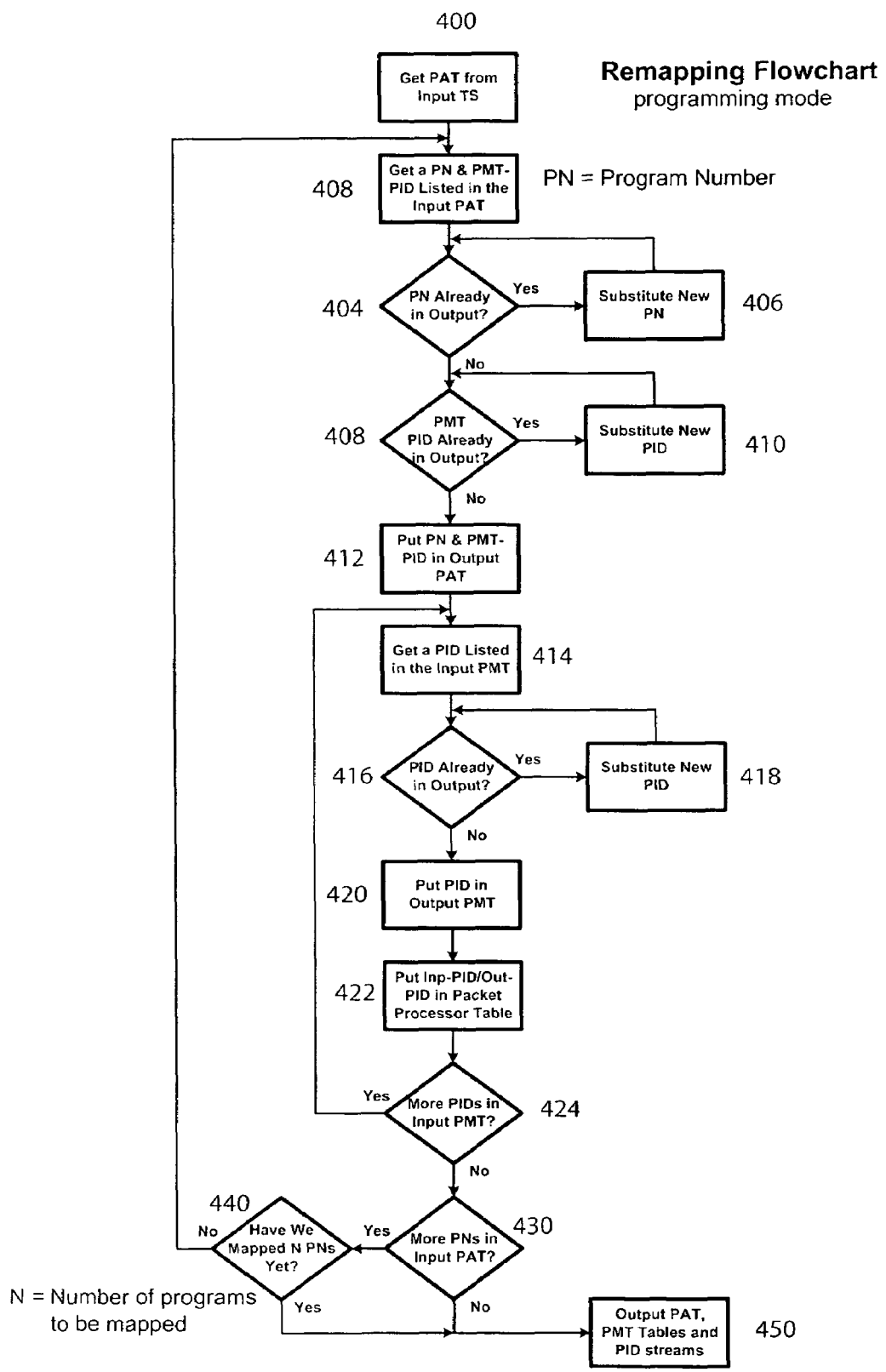
FIG. 12 is a flow chart of an alternative remapping method.

FIG. 12 is a flow chart of the remapping process executed in the "programming" mode for unrecognized input transport formats. These steps are executed by the remapping processor 100 according to any programming technique. First a PAT from the input transport stream is obtained 400 and stored temporarily in memory 102 until a new output PAT and output PMT are built.

A first input program number and a first PID for the first Program Map Table are gotten from the input PAT at step 402. These will be processed in steps 404 to 412 to build the new output PAT. First the PN is compared to the last used table of known formats to determine if that PN is already being used for output, that is, to see if the cable system has already assigned that number for use by another output program stream, making it unavailable for remapping the current input program stream. (The first PN will of course be "no".) If it is already assigned elsewhere, a new PN is substituted 406. As indicated in the flow chart, PNs are incremented in the substitution step 406 until an unassigned PN is reached. It is recognized and anticipated that the automatic remapping of the present invention may substitute PNs by any other programming technique without departing from the scope of the present invention. For example, new PNs may be randomly generated. If the original or newly incremented PN is not already in the output PAT 404, the process proceeds to step 408.

In a similar fashion, the PMT PIDs are remapped. If the first PMT PID is already in the output PAT, a new PID number is substituted 410. If not, the process proceeds. At step 412, either the original PN and PMT PID, now verified to remain unique in the cable system, or a newly substituted PN and PMT PID, are entered in the output PAT.

Steps 414 to 424 remap the first PMT. The first PMT is gotten from the input transport stream. A first PID is gotten from the first PMT 414. If it is already assigned in an output PMT, the PID is substituted 418 and put in the new output PMT 420. If it is not already assigned 414, the original PID is put in the output PMT 420.

The input PID and output PID are next put in the Packet Processor Table 422. Then the process increments to the next PID in the PMT 424 until they are all remapped.

At step 430, the process increments to the next program number in the PAT. If they are all remapped, the results are output at step 450. The Packet Processor Table is sent to the packet processor. In alternative embodiments, the resulting PATs and PMTs may be stored as a Stored Format Table, or not stored until that format has been used a number of times, or not stored at all.

Output may be limited by capacity or preference. For example, output transport streams may be carrying programs from multiple sources, and only the first three programs from any (or, alternatively, a particular) input transport stream are to be distributed. If only a preconfigured number of programs are to be forwarded through the cable system, that limit may be entered for checking at step 440. If more program numbers remain in the input transport stream, but the preconfigured limit has been reached already, the results will be output per step 440 without further processing.

The output of the remapping process is a packet processing table, as described in FIGS. 11 and 12. This table will be executed by the packet processor 101 as the final step in outputting a remapped transport stream.

Actually, two tables are used; they are illustrated in FIGS. 13 and 14. FIG. 13 shows a program number remapping table and FIG. 14 shows a PID remapping table. These tables assume a packet processor configured to process a maximum of 16 programs and 64 PID remappings, for an average of 4 PIDs per program.

In FIG. 13 the first column represents a simple item number for each remapped program number. This item number will be referenced in the PID remapping table. Column 2 is the input number. This represents the hardware input source from which the transport stream is being received. In the proceeding examples of the depicted embodiment, these have been ASI ports. The input program numbers are in the third column. The fourth column is the output number, meaning the physical hardware output to which the remapping transport stream is sent. The fifth column is the remapped output program numbers. The final column simply represents whether or not a program and its remapping are active or inactive.

Accordingly, FIG. 13 shows an example where six programs are being remapped; items 1-6. The first two were received over a first ASI port (input "1") and the last four were received over the second ASI port. The input program numbers that conflict and require remapping are 3 and 2 for the transport stream received over the first input, and also 2 and 3 for the transport stream received over the second input, as is seen in the third column, the input program numbers. They are reassigned new output program numbers to resolve the conflict. The remapping has reassigned output program numbers in a functioning sequence, 1, 2, 3, 4, 5, 6 as is indicated in the fifth column. These are each unique, in spite of being distributed over different channels, because cable systems require unique program number assignments. The final column simply indicates that these six programs are actively being remapped and shown, and the rest are not.

FIG. 14 shows a PID remapping table. The example designations populated in this table correspond to those of the example in FIG. 13. The first column is a PID table item number. The second number is an Program Number Table item number. The third column is an input hardware source identifier. The fourth column is the PID numbers used in the incoming transport stream. The fifth column is the output hardware destination identifier. The sixth column is the remapped PID numbers used in the outgoing transport stream. The seventh column is the stream type.

Accordingly, in the example, six programs are active and being remapped. These are items numbers 1 through 6 in the program number remapping table, which table contains their output program numbers, which are also 1 through 6. Because each program is made of one video Elementary Stream and one audio Elementary Stream, there will be 12 items in the PID remapping table, FIG. 14, for these six programs. Accordingly, items 1 and 2 of the PID remapping table correspond, as indicated in the second column, to item number 1 of the Program Number Remapping table. Both elementary streams 1 and 2 were received over a first ASI port, indicated by input number 1 in the third column in the PID remapping table. These had input PIDs 49, 52, 33 and 36. As can be seen in the example, these conflict with the same PID numbers which were received through a second ASI port, identified as input number 2 in items 5 through 8 in the third column of the PID remapping table. Because of this conflict, these will need to be reassigned. This especially true since in the example these are all going out over the same output hardware, indicated as output number 1 in the fifth column of the PID remapping table. Accordingly, output PIDs have been remapped to PIDs 101, 102, 104 and 105, as indicated at items 5 through 8 of the sixth column of the PID remapping table. The PIDs for the fifth and sixth programs are different than those for the other programs being output to output device number 2, and so they may remain the same, without remapping. A cable system operator may prefer to make all PIDs unique for all streams, but it is typical that the cable systems only require unique program numbers overall, and unique PIDs within a single transport stream. Accordingly, it is possible for remapped PIDs being output to one output device to be same as the remapped PIDs being output on a different output device.

The final column of the PID remapping table indicates the stream types, audio or video, which are therein indicated as either 2 or a 129.

Another task of the Packet Processor is re-timestamping the Elementary Stream packets.

The statistical nature of the packet multiplexing technique causes the arrival time of individual packets to vary. For example, PAT and PMT packets might be inserted in the TS, delaying a video packet. Also the audio and video decoders introduce different delays.

To insure that audio and video are presented smoothly and in synchronization, the Elementary Stream packets are periodically branded with a timestamp for each Elementary Stream. This timestamp is known as the Program Time Stamp (PTS).

In addition, a timestamp called a Program Clock Reference, (PCR) is periodically inserted for each Program. The PCR is the numerical value of a large, 42-bit counter, running at 27 MHz. The gross value of the PCR is not important, as long as the PTSs for the program are derived from it. The gross value of the PCR is called its Epoch.

The decoder uses the PCRs, over a substantial period of time, to adjust a stable clock so that it agrees with the PCRs. This stable clock is called the System Clock Reference (SCR). The decoder buffers the audio and video packets and attempts to adjust its presentation rate so that the PTSs of the audio and video each match the SCR.

Re-timestamping is preferred for remapping. When the Packet Processor assembles an output stream with a new mix of Programs, it is likely that packets containing PCRs will occasionally be moved in time with respect to each other. Since the PCRs represent a realtime clock count, the moved PCR value would be wrong. So, the Packet Processor must recover the SCR (for each program), just as a decoder does. It then must use this SCR to correct the values of the PCRs to match their actual new time-positions in the stream. This is called re-timestamping.

Depending on the particular implementation of the recovery of the SCR, it may not have the same epoch as the actual PCRs. In this case, the Packet Processor re-timestamps the PTSs to match the new epoch. In doing this, it must be careful to maintain the relative offsets between the PCR and the PTSs.

Notice that the since the re-timestamping operations take place on the high-speed video data streams, it often generally not feasible to use the Automapper controller to do this operation. Rather, dedicated logic in the FPGA is usually used.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. In a device receiving multiplexed, packetized input data streams and outputting other multiplexed, packetized data streams, an output data stream mapper comprising:
    an interface with an input data stream;
    a packet processor identifying and routing a selected plurality of related packets;
    a memory retaining at least one stored format table, said stored format table having at least one stored set of input program numbers associated with at least one stored set of output program numbers, said memory further being configured to retain a current PAT;

a mapping processor receiving a packet from said packet processor, the packet being the current PAT from the input data stream, said mapping processor further comparing at least one set of input program numbers in the current PAT to said at least one stored set of input program numbers in said stored format table;

said mapping processor further outputting, if the at least one set of input program numbers in the current PAT is the same as said at least one stored set of input program numbers in said stored format table, an output data stream having said at least one stored set of output program numbers from said stored format table; and said mapping processor further generating, if at least one input program numbers in the current PAT is not the same as any stored set of input program numbers in the stored format table, a new program numbers and then output another output data stream having reassigned output program numbers, said reassigned output program numbers having said newly generated program numbers.

2. The output data stream mapper of claim 1 wherein said newly generated program numbers are generated by random number generation.

3. The output data stream mapper of claim 1 wherein said newly generated program numbers are generated by incrementing numbers.

4. The output data stream mapper of claim 1 wherein said mapping processor further receiving the packet from said packet processor, the packet being the current PAT from the input data stream, said mapping processor comparing an input PMT PID in said current PAT to a known PMT PID in said stored format table;

said mapping processor further outputting, if the input PMT PID in the current PAT is the same as the input PMT PID in the stored format table, another data stream having output PMT PID from the stored format table; and said mapping processor further outputting, if the input PMT PIDs in the current PAT are not the same as the input program numbers in the stored format table, another data stream having reassigned output PMT PIDs.

5. The output data stream mapper of claim 4 wherein said mapping processor further generating, if the input PMT PIDs in the current PAT are not the same as the input PMT PIDs in the stored format table, new PMT PIDs and then output another data stream having reassigned output PMT PIDs, said reassigned output PMT PIDs being said newly generated PMT PIDs.

6. The output data stream mapper of claim 5 wherein said newly generated PMT PIDs are generated by random number generation.

7. The output data stream mapper of claim 5 wherein said newly generated PMT PIDs are generated by incrementing numbers.

8. The output data stream mapper of claim 1 wherein said mapping processor further outputting, if the input program numbers in the current PAT are not the same as the input program numbers in the stored format table, another output data stream having reassigned output PIDs within the PMTs.

9. The output data stream mapper of claim 8 wherein said reassigned output PIDs within the PMTs are newly generated by said mapping processor.

10. The output data stream mapper of claim 9 wherein said newly generated output PIDs within the PMTs are generated by random number generation.

11. The output data stream mapper of claim 9 wherein said newly generated output PIDs within the PMTs are generated by incrementing numbers.

12. The output data stream mapper of claim 1 wherein said packet processor further re-timestamping output packetized data streams.

13. The output data stream mapper of claim 1 wherein said mapping processor is further for error correction.

14. The output data stream mapper of claim 13 wherein said error correction occurs when a repeated failure of a single input program number has been recognized.

15. The output data stream mapper of claim 13 wherein said error correction occurs when at least two different input program numbers are not recognized.

16. The device of claim 1 wherein said data streams include high definition content.

17. The device of claim 1 wherein said output data streams are statistically multiplexed.

18. The device of claim 1 further comprising a network interface with said mapping processor.

19. The device of claim 1 further comprising a network interface with said packet processor.

20. The device of claim 1 wherein said memory is updated by a received packet processor table.

21. The device of claim 1 wherein said stored format table stores program numbers and transport streams.

22. The device of claim 1 wherein each of said stored format tables is comprised of a single table having stored input program numbers, stored input transport streams, stored output program numbers and stored output transport streams.

23. The device of claim 1 wherein said each of said stored format tables is comprised of an input table and an output table, said input table having stored input program numbers and stored input transport streams and said input table being associated with said output table, said output table having stored output program numbers and stored output transport streams.

24. The device of claim 1 further comprising a display notifying a human operator when the input program numbers are not found in said stored format table.

25. The device of claim 1 further including a stored preference table.

26. The device of claim 1 wherein said memory further includes a temporary storage of at least one incoming PMT.

27. The device of claim 1 wherein said mapping processor is configured to check for a unique PID for each input PMT.

28. The device of claim 27 wherein said mapping processor further assigning new PIDs for input PMTs such that each output PMT has a unique PID.

29. The device of claim 1 wherein said mapping processor further checking if an incoming program number corresponds to a unique output program number.

30. The device of claim 29 wherein said mapping processor further assigning a unique output program number for each incoming program number.

31. The device of claim 1 further comprising a memory for storing at least one of a newly generated PAT or a newly generated PMT.

32. The device of claim 1 further comprising a capacity limit on a number of programs.

33. The device of claim 1 further comprising a program number remapping table.

34. The device of claim 33 wherein said program number remapping table includes an item number, an input designation, an output number and an activity designation.

35. The device of claim 1 further comprising a PID remapping table.

36. The device of claim 35 wherein said PID remapping table includes an item number, an input designation, an output number, an output designation and an activity indicator.

37. The device of claim 33 wherein said mapping processor is further configured to assign unique PID numbers for each output data stream.

* * * * *